United States Patent [19]

Waldron et al.

[11] 4,248,282

[45] Feb. 3, 1981

[54] TEMPLATE GENERATOR

[76] Inventors: Richard W. Waldron, 706 Pauline Ave., Utica, N.Y. 13502; James S. Cieri, 9 New Paris Rd., New Hartford, N.Y. 13413

[21] Appl. No.: 57,589

[22] Filed: Jul. 16, 1979

[51] Int. Cl.³ .............................................. B27C 5/00
[52] U.S. Cl. .............................. 144/144 R; 144/323; 409/124
[58] Field of Search ............... 144/136 R, 137, 144 R, 144/323; 409/124

[56] References Cited

U.S. PATENT DOCUMENTS

| | | | |
|---|---|---|---|
| 2,664,122 | 12/1953 | Allen, Sr. | 144/144 R |
| 3,739,824 | 6/1973 | Hoenig | 144/144 R |
| 4,024,898 | 5/1977 | Bergler et al. | 144/136 C |

*Primary Examiner*—W. Donald Bray
*Attorney, Agent, or Firm*—Bruns & Jenney

[57] ABSTRACT

An adaptor for use in a woodworking machine that utilizes a conventional router as a cutting means. The adaptor is mountable upon the router support carriage of the machine and enables the router to be used to cut a template generated from the profile of a preexisting part or an easily prepared pattern from which new parts can be produced thereby considerably expanding the usefulness of the machine.

14 Claims, 5 Drawing Figures

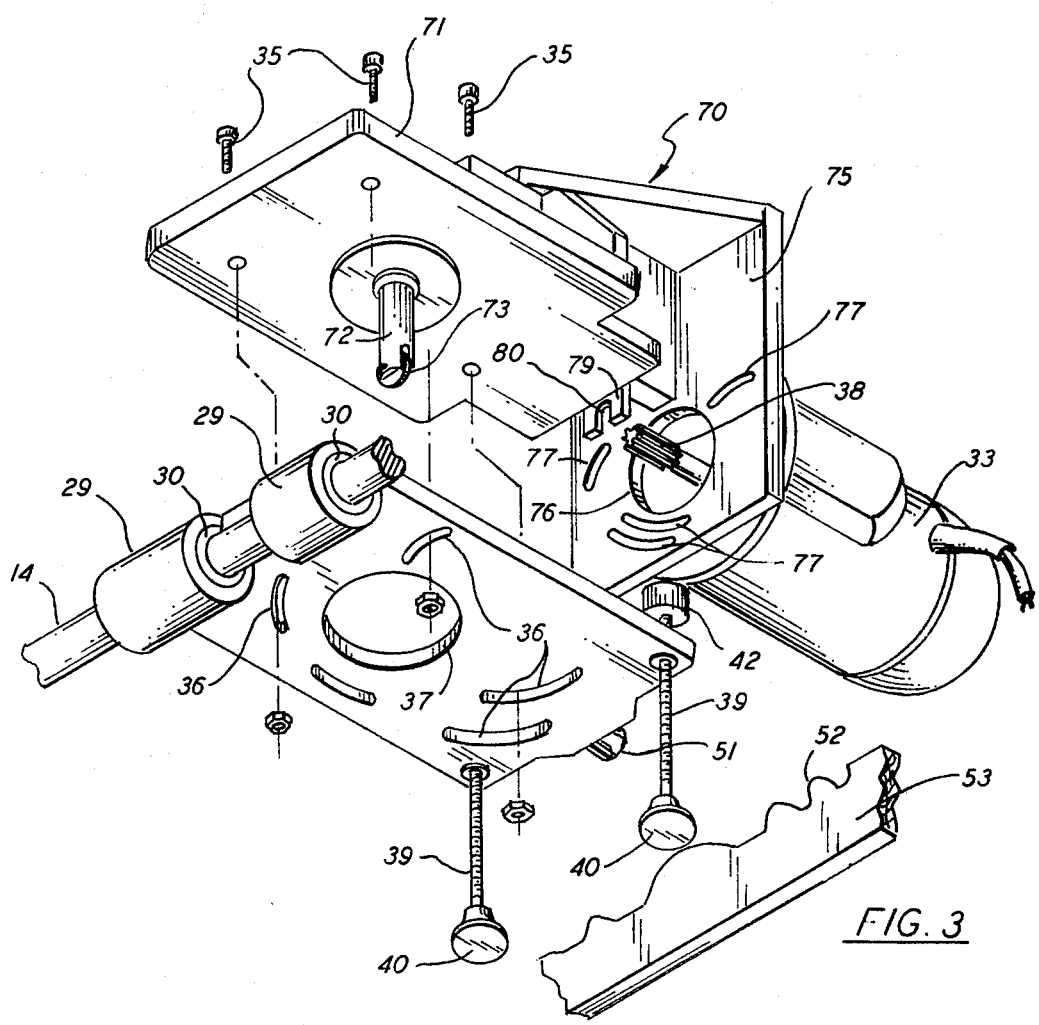
FIG. 3
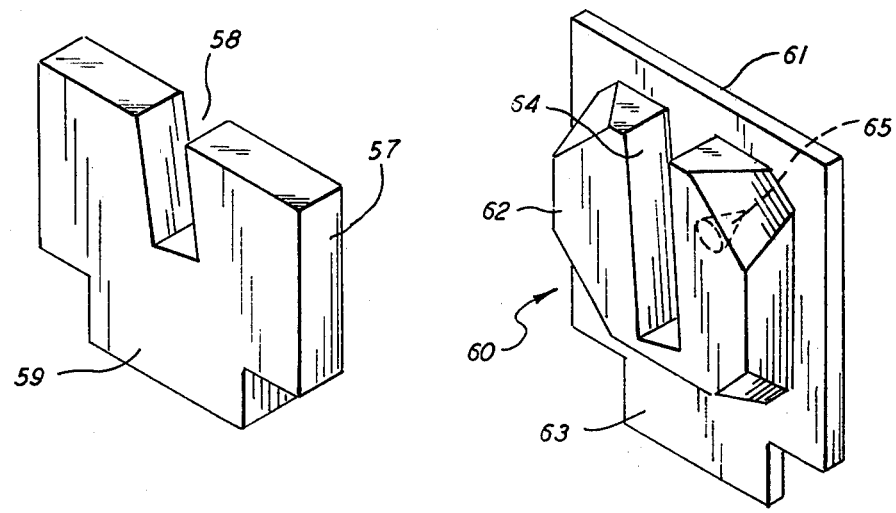
FIG. 4
FIG. 5

TEMPLATE GENERATOR

BACKGROUND OF THE INVENTION

This invention relates to a template generator and, in particular, to a template generator for use in a woodworking machine that utilizes a conventional router as a cutting means.

In U.S. Pat. No. 3,946,774, there is disclosed a woodworking machine that employs a carriage mounted router for cutting contoured surfaces of different designs in a work piece. For want of a better name, this device shall be herein referred to as a router turning machine. As disclosed in the noted patent, the work piece is supported in the work bed between a head stock and a tail stock so that it can be turned about the horizontal axis of the machine. The router, on the other hand, is vertically supported over the work upon a carriage with the cutter being generally perpendicularly aligned with the axis of the machine. The carriage is slidably mounted upon a horizontal guide rail to enable the tool to be moved parallel with the work along the length of the bed. The carriage is also pivotably supported upon the guide rail to allow the carriage to swing in a vertical plane about the rail and thus raise or lower the cutter in reference to the work. A pair of adjusting screws are provided by which the vertical positioning of the carriage may be regulated, thereby controlling the depth of cut taken by the tool.

Both the carriage and the work can be moved independently so that circular and axial cuts can be produced in the work. Through means of a pulley system, the turning motion of the work may also be coordinated with the axial motion of the carriage whereupon the cutter is able to generate a spiral groove in the work piece.

Although not disclosed in the noted patent, the vertical positioning of the carriage along the axial length of the work bed is also controllable by use of a template that is mounted adjacent to the bed. A follower is secured in the vertically movable side wall of the carriage and is arranged to ride in the contoured control surface of the template. a prescribed vertical motion is thus imparted to the cutter which causes the cutter to be raised and lowered in reference to the work as the carriage is moved axially along the length of the work bed.

The motion translated to the cutter by the follower system is arcuate in form because of the carriage mounting arrangement. The template profile must therefore be corrected in order to compensate for the non-linearity of the system. As a consequence, original or preexisting parts cannot be used as master templates from which exact duplicates can be generated. The templates that are available are limited to a few basic designs. This seriously impedes the usefulness of the machine as well as restricts the type of creative work that can be performed thereon.

SUMMARY OF THE INVENTION

It is therefore an object of this invention to improve woodworking machines which utilize a router as a cutting tool.

Another object of the present invention is to expand the flexibility and degree of usage afforded a router turning machine.

Yet another object of the present invention is to enable a router turning machine to accurately duplicate contoured parts by using a preexisting part as a master pattern.

A further object of the present invention is to use a router turning machine for generating its own templates so that any desired contour can be produced therein.

A still further object of the present invention is to provide an adaptor for use in a router turning machine that will enable the machine to cut its own templates from different types of patterns.

These and other objects of the present invention are attained by means of a router turning machine of the type wherein the work is supported in a work bed between a head stock and a tail stock along the horizontal axis of the machine and having a router removably supported in a carriage over the work with the cutter being generally perpendicularly aligned with the machine axis. The carriage can be moved axially along the work bed and also be pivoted in a vertical plane to adjust the location of the cutter in reference to the work. A template follower is affixed to the carriage which is capable of riding in the contoured working profile of a template to raise and lower the cutter as the carriage is moved axially along the work bed whereby a prescribed design is cut in the work. An adaptor is herein provided that can be mounted upon the carriage in place of the router providing for the generation of a template suitable for use in the machine. The adaptor includes a work follower that is supported from the carriage in the normal cutter position at the normal cutter depth. A vertical mounting flange depends from the frame of the adaptor adjacent to the pivotable side wall of the carriage and contains mounting holes for supporting the router in accurate alignment with reference to the template follower whereby the cutter faithfully reproduces the motion of the template follower as the carriage is vertically displaced.

In one embodiment of the invention, an existing part that is to be duplicated is mounted between the head stock and the tail stock of the machine and a template blank is positioned adjacent to the work bed where it can be acted upon by the cutter. The carriage is moved axially over the work piece so that the work follower traces the contour thereof. Correspondingly, the router cutter is caused to generate a contour in the template blank that is automatically corrected for the non-linear vertical motion of the carriage. Once the template has been generated, the adaptor is removed from the carriage and the router relocated in its normal carriage position and a work piece cut to the desired configuration using the prepared template.

In a further embodiment of the invention, end rests are mounted in the head stock and the tail stock of the machine for receiving therein a planar master pattern in which a desired contour has been cut. The master pattern is used in the same manner as a preexisting part to generate a template.

BRIEF DESCRIPTION OF THE DRAWINGS

For a better understanding of these and other objects of the present invention, reference is had to the following detailed description of the invention which is to be read in conjunction with the accompanying drawings, wherein:

FIG. 3 is an exploded view in perspective showing the adaptor and the carriage; and FIGS. 4 and 5 are also perspective views of the end rests used in the present invention for supporting a pattern in the work bed of the machine shown in FIG. 1.

DESCRIPTION OF THE INVENTION

Figure 1:
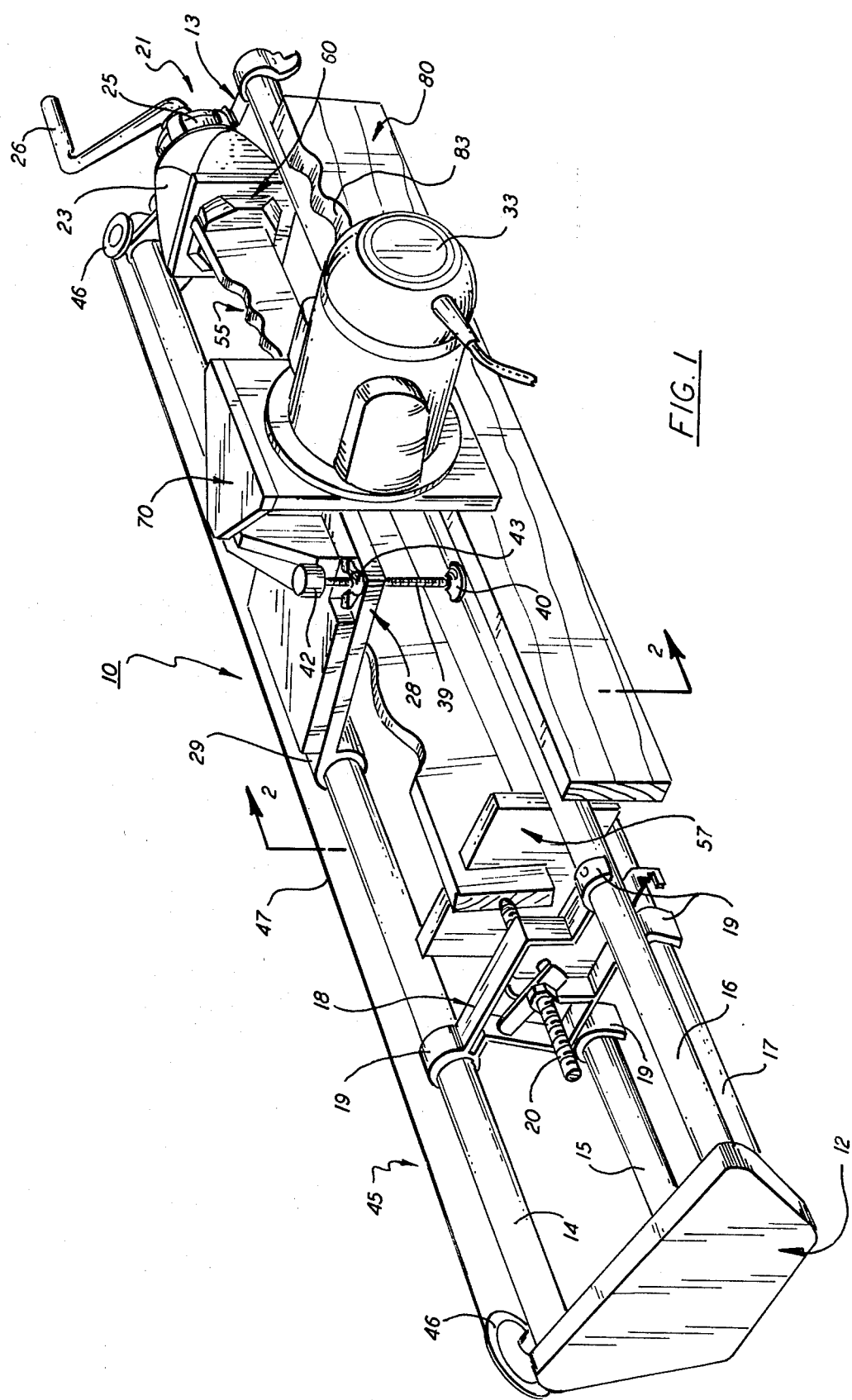
FIG. 1 is a perspective view of a router turning machine embodying the teachings of the present invention.

Referring initially to FIG. 1 there is illustrated a woodworking machine generally referenced 10 that embodies the teachings of the present invention. The machine is basically of the same design as that described in the above-noted patent and the teachings thereof are herein incorporated by reference.

The present machine contains a pair of end blocks 12 and 13 in which are securely anchored four horizontal aligned polished steel tubular rails 14–17. The tail stock 18 of the machine is slidably supported upon the rails by means of clamps 19—19 so that the dead center 20 may be axially positioned in reference to the head stock 21 secured to end block 13. The area of the machine between the head stock and the tail stock shall be herein referred to as the work bed. The head stock is provided with a rectangular hood 23 which normally accepts one end of a work piece therein and automatically centers the work along the central axis of the work bed as the work is driven therein by the dead center of the tail stock. The head stock also includes an indexing head 25 and a crank 26 by which the work piece is turned about the axis of the machine.

A flat carriage 28 is mounted upon the uppermost rail 14 by means of a pair of bearing blocks 29—29. In practice, the rail 14 serves as a guide rail to control the motion of the carriage and shall hereinafter be referred to as such. A linear bearing 30 is contained in each bearing block which permits the carriage to slide axially back and forth along the length of the work bed. The bearings also allow the carriage to swing or pivot about the guide rail within a vertical plane. Normally, when the machine is being utilized to turn or shape a work piece mounted between the head and tail stocks, a router, such as router 33, is removably bolted or clamped to the top surface 34 of the carriage. The router is normally supported upon the carriage in a vertical position by means of bolts 35 that pass through slotted holes 36 as illustrated in FIG. 3. An accurately formed hole 37 is provided in the carriage which is generally centered over the axis of the machine and through which the router cutter 38 gains access to the work.

A pair of adjustable support screws 39—39 are threaded through the outboard side of the top surface, that is, the side opposite the bearing blocks, so that the foot 40 of each screw is able to rest in contact against rail 16. Each screw is provided with a relatively large head 42 to facilitate turning and a wing nut 43 for locking the screw in a desired location against the carriage. The screws enable the carriage to be adjusted in a vertical plane to either raise or lower the cutter in reference to the work. In operation, the cutter is generally supported in perpendicular alignment in reference to the axis of the machine but, because of the arcuate motion imparted thereto by the carriage, the cutter follows a non-linear path as it moves toward or away from the work.

A pulley drive system 45 is operatively connected to the crank 26. The system includes a series of pulleys 46—46 and an endless wire 47 that is wound about a crank driven drum (not shown) located in the head stock. As explained in the above-noted patent, the wire may be selectively secured to the carriage thereby coordinating the axial movement of the cutter with the turning motion of the work so that spiral flutes or grooves can be generated in the work. It should be understood by one skilled in the art that the head stock of the machine is locked during the template generating operation and the carriage is released from the drive wire to allow the carriage to move freely along the rails.

As best seen in FIG. 3, the outboard side wall of the carriage contains an outwardly extended housing in the form of a nose section 50 that is arranged to receive therein a template follower 51. With the adjusting screws 39—39 retracted, the template follower is capable of riding along the working profile 52 of a template 53. In assembly, the template is positioned adjacent to and in parallel relation with the work bed of the machine and serves to regulate the vertical motion of the carriage as it moves axially along the guide rail over the length of the bed. Accordingly, a prescribed motion is imparted through the carriage to the router which dictates the depth of cut taken by the cutter. As noted, the motion imparted to the cutter is non-linear and therefore the contour of the template cannot be an exact replica of the piece that is to be reproduced. As a consequence, an existing part, such as a furniture spindle or the like, cannot be used as a template in the machine to generate duplicate parts.

To overcome this difficulty, the present machine is herein provided with a relatively simple adaptor that enables the machine itself to create templates of any suitable design from either existing parts or form exact replicas that faithfully depict the desired axial contour.

Figure 2:
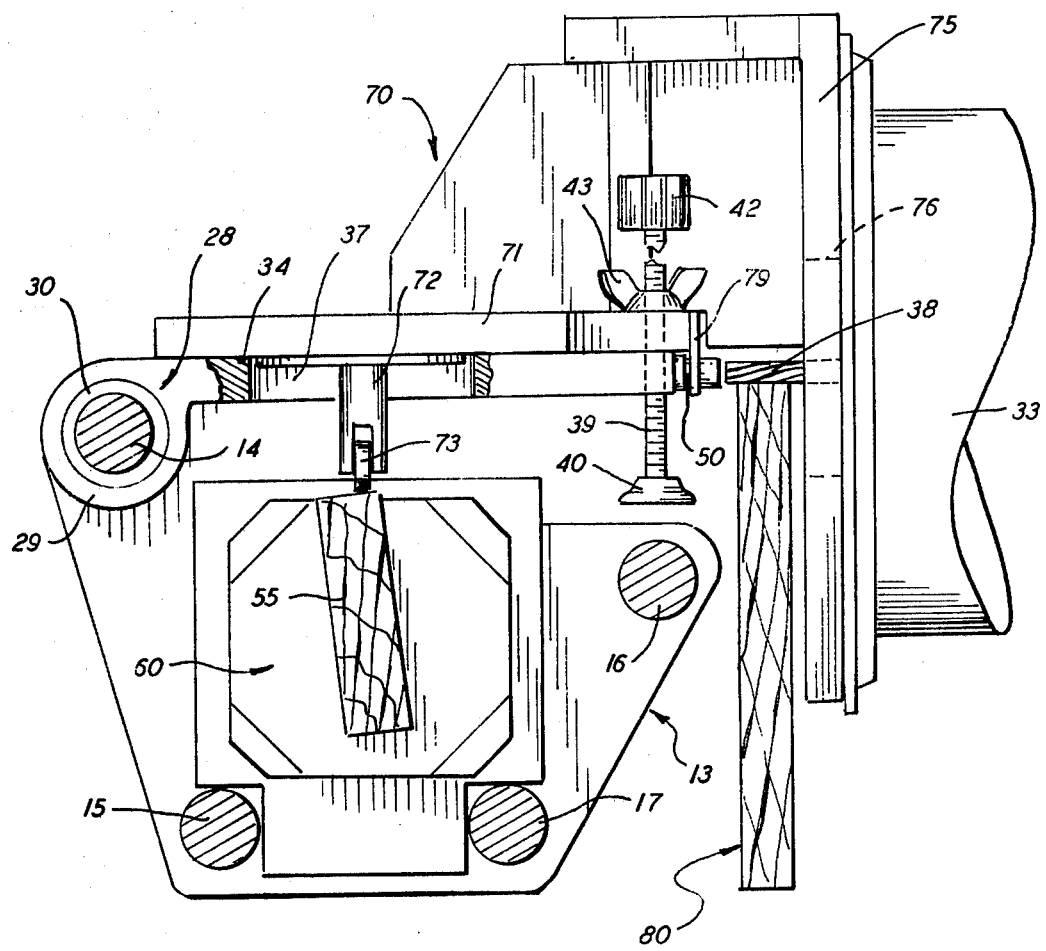
FIG. 2 is an enlarged partial section taken along lines 2—2 in FIG. 1 showing the carriage adaptor of the present invention.

As illustrated in FIGS. 1 and 2, the pattern is suspended in the bed between the head stock and the tail stock of the machine. End rests as shown in FIGS. 4 and 5 are provided to facilitate mounting of the pattern. The tail rest 57 consists of a rectangular block having an angularly offset slot 58 cut downward through its top surface and a downwardly extended shoulder 59 depending from its bottom surface. The shoulder is arranged to be received between the two bottom rails 15 and 17 of the machine to support the rest in an upright position and to prevent the rest from turning in the bed.

The head rest 60 includes a back plate 61 and a face plate 62 that are cojoined by any suitable means as illustrated in FIG. 5. The base plate contains a shoulder 63 similar to that of the tail rest which is also receivable between the two lower rails. An offset slot 64, which compliments that formed in the tail rest, is cut downwardly in the face plate. The head rest is designed to be reversibly mounted adjacent to the head stock to either support a preexisting cylindrical part therein or a flat master pattern as shown. When supporting a flat master pattern the face plate of the rest will be facing the tail stock of the machine with both ends of the pattern being received in the slots of the rests, as shown in FIG. 1. To mount a preexisting part, such as a contoured spindle or the like, in the bed, the head rest is positioned so that a dead center 65, which is secured in the back side thereof, faces the tail stock. The dead center 65, in assembly, is coaxially aligned with the dead center 20 located in the tail stock. Accordingly, the preexisting part can be conveniently supported between centers to automatically align the part along the axis of the machine. The face plate of the head rest is shaped so that it is slidably received within the hood of the head stock to automatically position the dead center 65 upon the axis of the machine.

The present invention will be explained in greater detail with reference to a flat master pattern 55 which has been prepared in advance from a flat piece of wood. The pattern is mounted in the bed of the machine between the two rests with the ends thereof being securely seated in the rest slots. When seated in the slots, the contoured pattern is automatically positioned in reference to the machine axis.

When generating a new tamplate, the router is removed from the carriage and an adaptor, generally referenced 70, is mounted thereupon in its stead. The bolting plate 71 of the adaptor is secured to the carriage using the previously noted router mounting slots and bolts. A pattern follower 72, which is not to be confused with the template follower 51 carried in the side wall of the carriage, passes downwardly through the central hole 37 in the carriage and serves to support the follower roller 73 at the same axial position and depth as that normally assumed by the router cutter. As a result of this construction, the roller will trace the contour of the pattern as the carriage is moved axially upon the guide rail and alter the vertical position of the carriage in response thereto.

A mounting flange 75 is secured to the bolting plate 71 of the adaptor in perpendicular alignment therewith. The flange passes downwardly adjacent to the outboard side wall of the carriage and is adapted to removably support the router 33 therein in the same manner as the router is normally supported upon the carriage. To accomplish this end the flange is provided with a central hole 76 for accepting the router cutter and a series of slotted holes 77 which permits bolting of the router to the flange.

A guide 79 is secured to the bolting plate 71 of the adaptor that contains a U-shaped slot 80 which is adapted to slide over the cylindrical nose piece 50 (FIG. 2) of the template follower assembly and helps to locate the adaptor upon the carriage. Prior to mounting the adaptor upon the carriage, the tubular-shaped template follower 51 (FIG. 3) is slipped off of the nose piece to provide room for the router cutter 38. As best seen in FIG. 2, the router cutter is supported in the adaptor so that it is coaxially aligned with the cylindrical nose piece 50. Typically, the template follower is made from a hollow ½" diameter piece of stock. By using a ½" diameter cutter in the router, the cutter in assembly, will be mounted in the exact position of the template follower. As should be evident, the cutter, acting through the adaptor, will thus describe a motion imparted by the pattern follower as it moves axially over either a flat pattern or an existing cylindrical part mounted in the machine bed.

A template blank 80 (FIGS. 1 and 2) is positioned adjacent to the bed of the machine in the location normally occupied by the finished template 53 as shown in FIG. 3. The blank, in practice, will typically be a rectangular piece of wood or any other suitable material. In practice, the pattern follower is caused to ride axially along the machine bed to trace the actual contour that is to be reproduced. Since the router cutter is in the exact alignment as that normally assumed by the template follower, the spinning router cutter generates a template contour 83 in the blank which, in turn, can be used to reproduce the desired contour in any number of work pieces. When the template is completed, the adaptor is removed from the carriage and the router replaced thereon. The template follower is inserted in the nose piece and the machine is now in condition to assume normal operations.

It has been found that by placing the flat master pattern in the machine bed at an angle of about 6° with the vertical, the pattern follower will automatically be compensated for rises and falls in the flat contour of the master pattern as it traverses across the bed to translate a more accurate motion to the router cutter over the vertical displacement range of the carriage. Accordingly, the slot provided in each end rest is canted out of vertical plane at about 6° to angularly affect the pattern at the desired angle in the machine bed.

While this invention has been described with reference to the structure disclosed herein, it is not confined to the details set forth and this application is intended to cover any modifications or changes as may come within the scope of the following claims.

I claim:

1. In a woodworking machine of the type wherein an element is capable of being mounted in a bed between a head stock and a tail stock, said machine having a carriage removably supporting a router thereon, guide means for supporting the carriage for both axial movement along the length of the bed and pivotable movement in a vertical plane whereby the router cutter is positionable in reference to the work, and a template follower mounted in the carriage that is arranged to ride along the working profile of a template to vary the vertical position of the cutter as the carriage traverses the bed, the improvement comprising:

an adaptor that is positionable upon the carriage in place of the router, a pattern follower supported in the adaptor that is located at the normal router cutter position whereby the pattern follower will trace the axial contour of an element supported in the bed of the machine, and a vertical mounting flange depending from the adaptor for removably supporting the router adjacent to a side wall of the carriage so that the router cutter is coaxially aligned with the axis of the template follower when the adaptor is mounted upon the carriage whereby the cutter will generate a template from a blank in response to the displacement of the pattern follower as it moves axially over a piece supported in the bed.

2. The improvement of claim 1 that further includes a locating bracket mounted upon the adaptor having a slot for receiving a nose piece for supporting the template follower thereon, whereby the adaptor is located upon the carriage.

3. The improvement of claim 1 that further includes end rests that are mountable in the machine bed at the head and tail stocks for supporting a flat master pattern therebetween along the axis of said machine.

4. The improvement of claim 3 wherein each rest has a slot formed therein for receiving the end of said flat master pattern therein.

5. The improvement of claim 4 wherein the slots are angularly offset from the vertical plane of the rest at an angle of about 6°.

6. The improvement of claim 1 wherein the adaptor further includes a bolting plate for securing the adaptor to the carriage, said bolting plate being perpendicularly aligned with the router mounting flange.

7. The improvement of claim 3 wherein one of said rests is arranged to be mounted within the head stock to locate a dead center along the axis of the machine.

8. In a woodworking machine of the type wherein a conventional router is used as a cutting means, apparatus for generating a template for controlling the motion of the router cutter, including
- a head stock and a tail stock that are spaced apart along the bed of the machine for supporting a piece along the axis of the machine,
- a guide rail paralleling the axis of the machine that is positioned adjacent to the bed,
- a carriage for removably supporting a router over the bed whereby the router cutter can act upon a piece mounted in the bed, said carriage being mounted upon said rail for both axial movement therealong and pivotable movement thereabout whereby the location of the router cutter may be varied,
- a nose piece in said carriage for slidably supporting thereon a template follower for tracing the contour of a template and importing a prescribed motion to the carriage,
- an adaptor positionable on the carriage in place of the router and having a pattern follower that is located at the normal router cutter position which is able to trace the axial contour of a piece mounted between the head stock and the tail stock, and
- a mounting flange depending from the adaptor for removably supporting the router adjacent to the carriage with the cutter coaxially aligned with the template follower whereby the cutter will generate a template from a blank in response to the motion imparted to the carriage by the pattern follower.

9. The apparatus of claim 8 that further includes a head rest that is capable of being mounted in the head stock of the machine to position a dead center secured in the rest along the axis of the machine.

10. The apparatus of claim 8 that includes a pair of end rests that are mountable in the bed at the head and tail stock of the machine, each rest having a slot formed therein for receiving a flat pattern for locating the pattern in reference to the axis of the machine.

11. The apparatus of claim 10 wherein each slot is angularly offset at about 6° with the vertical plane of the rest.

12. The apparatus of claim 8 wherein the adaptor further includes a bolting plate for securing the adaptor to the carriage, the bolting plate being perpendicularly aligned with the router mounting flange.

13. The apparatus of claim 8 wherein the template follower is removably supported in the housing whereby the router cutter is positionable at the template follower location when the router is supported on the router mounting flange.

14. An adaptor for generating a template in a machine of the type wherein a router is removably mounted upon a movable carriage, the adaptor including
- a bolting plate having bolt holes located at the same locations as those contained in the router whereby the plate can be secured to the carriage in place of the router,
- a pattern follower extending downwardly from the bolting plate for tracing the contour of a piece supported in the machine, and
- a mounting flange that is perpendicular with the bolting plate for supporting the router thereon with the router cutter being at a predetermined position whereby the cutter describes a motion imparted thereto by the follower as it traces the contour of a piece supported in the machine.

* * * * *